INVENTOR,
Philip M. Cruse,
BY.

Noel B. Hammond

AGENT.

INVENTOR.
Philip M. Cruse,
BY
Noel B. Hammond
AGENT.

March 26, 1963  P. M. CRUSE  3,083,299
APPARATUS FOR PROCESSING OPTICALLY RECEIVED
ELECTROMAGNETIC RADIATION
Filed Sept. 25, 1959  3 Sheets-Sheet 3
Fig. 4.
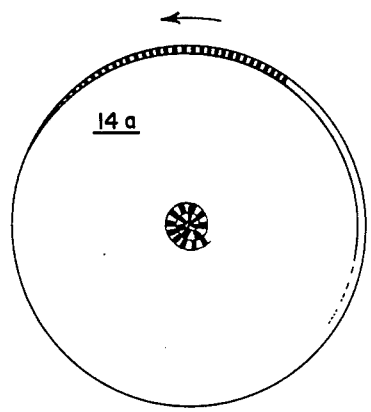
Fig. 5.
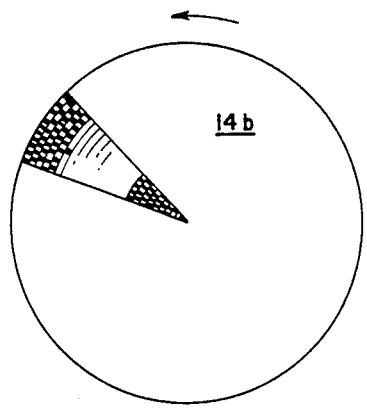
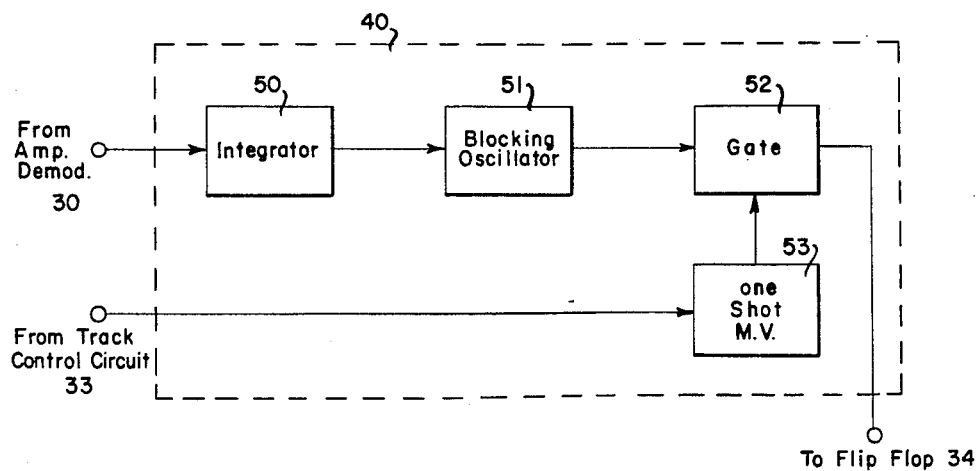
Fig. 6.
INVENTOR.
Philip M. Cruse,
BY.
Noel B. Hammond
AGENT.

United States Patent Office 3,083,299
Patented Mar. 26, 1963

3,083,299
APPARATUS FOR PROCESSING OPTICALLY RECEIVED ELECTROMAGNETIC RADIATION
Philip M. Cruse, Santa Barbara, Calif., assignor to Santa Barbara Research Center, Goleta, Calif., a corporation of California
Filed Sept. 25, 1959, Ser. No. 842,523
10 Claims. (Cl. 250—203)

The present invention relates to electromagnetic radiation detection apparatus of the optically focused type, and more particularly to equipment for searching for or tracking a selected radiation source while discriminating against other radiation sources.

Apparatus for searching for and tracking sources of electromagnetic radiation such as infrared radiation, for example, are usually found either in stationary surveillance stations or in target-seeking guided missiles. The purpose of such apparatus is to distinguish predetermined radiation sources or targets, such as enemy planes, from sources of background radiation such as clouds or the horizon. The apparatus provides an output signal indicative of the amplitude of the radiation or of the size or position of the target, and follows or tracks the source when it is moving.

Frequently, such devices include a mechanically moved optical system having a small field of view which mechanically scans or searches for a source of radiation and mechanically follows or tracks it. Such devices are cumbersome and difficult to move rapidly. In addition, in the case of infrared detection, infrared radiation detectors are ordinarily cooled to a very low temperature and it is often difficult to circulate a refrigerant to mechanically move apparatus.

Although electronic scanning, rather than mechanical scanning, may be attempted by providing a mosaic of detectors, it is difficult to build sensitive detectors having uniform characteristics mounted in close proximity to each other. Further, switching at low signal levels is noisy, requiring the use of a separate amplifier for each detector, which is extremely bulky.

Additionally, the radiation is ordinarily interrupted by an episcotister or reticle prior to its interception by a detector to provide an alternating signal which is subsequently processed in electronic circuits. Ordinarily, opaque and transparent sections of the episcotister are formed into what is sometimes referred to as a checker-board pattern. That is, concentric rings are divided into alternate opaque and transparent sections, an opaque section in one ring being disposed adjacent transparent sections in adjoining rings.

If the rings are evenly divided into sections on an angular basis, then each of the concentric rings will contain the same number of sections and the interruption frequency will be the same in each ring. However, the sections in the outer rings will be larger than the sections in the inner rings. If the sections in the inner rings are made approximately the same size as the smallest image resolved by the optical system, then the sections in the outer rings are large compared to an image of the same size. Accordingly, the background discrimination capabilities of the reticle will be degraded in proportion to the distance from the center of the reticle. The result is that a target such as an enemy plane may be indistinguishable from a cloud or other background radiation source because the reticle cannot take full advantage of the optical image quality over the full field of view in suppressing background signal.

To increase the discrimination against large background radiation sources, the outer rings of the reticle may be subdivided into smaller sections. This results in a variation in the interruption frequency of the signal over a frequency band in accordance with the position of the image on the reticle. Thus, subsequent circuits must be designed to accommodate this wider frequency bandwidth. However, broadening the bandwidth of the subsequent circuits results in a degraded signal-to-noise ratio and a decreased sensitivity. Therefore, some compromise is usually made between a good signal-to-noise ratio and good background discrimination.

Accordingly, it is an object of the present invention to provide apparatus which provides the electronic equivalent of mechanical scanning of an optical field.

Another object of the invention is the provision of optical electromagnetic radiation detection apparatus which provides both optimum signal-to-noise ratio and optimum discrimination against large background radiation sources over the entire optical field of view.

Still another object of the invention is the provision of radiation detection apparatus which electronically scans an optical field of view at a rapid rate.

A further object of the present invention is the provision of apparatus for detecting radiation which is relatively simple, inexpensive and compact.

In accordance with these and other objects of the invention, a fixed optical system focuses images of radiation sources through a rotating episcotister or reticle onto an electromagnetic radiation detector. The reticle rotates at a constant speed and is so arranged that the frequency of interruption of the radiation is proportional to the radial distance from the center of the reticle to the point at which the radiation passes through the reticle. Frequency-selective means is provided to discriminate against undesired signals and noise. Subsequent electronic circuits process the desired signal with techniques similar to those used with radar systems.

The following specification and the accompanying drawing describe and illustrate exemplifications of the present invention. Consideration of the specification and the drawing will lead to an understanding of the invention, including the novel features and objects thereof. Like reference characters are used to designate like parts throughout the figures of the drawing.

FIG. 4 is a representation of another embodiment of a reticle in accordance with the present invention;

FIG. 5 is a representation of still another embodiment of a reticle in accordance with the invention; and FIG. 6 is a diagram in block form of a search control circuit which may be used in the utilization and control circuit of FIG. 3.

Figure 1:
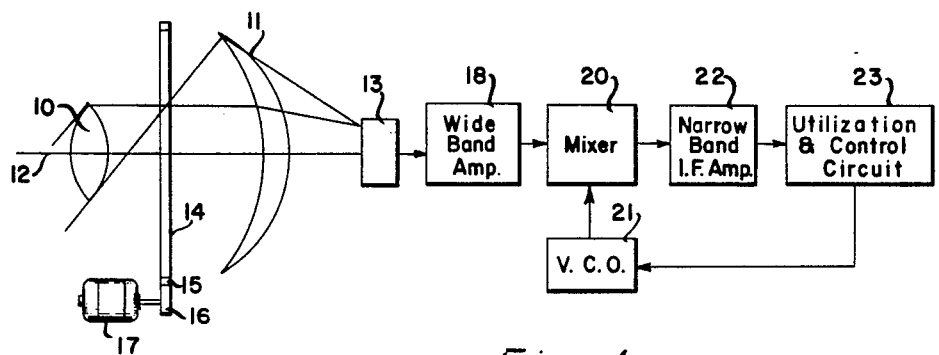
FIG. 1 is a schematic diagram of a radiation detection system in accordance with the invention.

An embodiment of a system for optically detecting electromagnetic radiation in accordance with the invention is illustrated in FIG. 1. Although the exemplary system to be described is for the detection of infrared radiation, it should be understood that this system may be modified to accommodate other types of radiation such as ultraviolet or high-frequency microwaves which can be focused by optical methods.

An optical system or telescope is provided which, in the present example comprises an objective lens 10 and a condensing lens 11. The material used to make the lenses 10 and 11 is selected according to the type of radiation being detected. In the present example of an infrared system, the lenses are formed of silicon. However, in the case of microwave radiation, Luneberg lenses formed of polystyrene may be used. The lenses 10 and 11 are disposed along an axis 12 which is the optical axis of the system. A source of radiation to the left of the objective lens 10 forms an image at a focal point to the right of the condensing lens 11. A detector 13 is disposed at the focal point and, in the present example of an infrared system, the detector 13 is formed of lead selenide. The detector 13 develops a direct current output voltage when radiation impinges upon it. The optical system or telescope formed by the lenses 10 and 11 has a wide field of view and may be, for example, 60° or even greater. However, in the present example, the optical system has a field of view of 4° and the smallest image which can be resolved is one milliradian or $9/50\pi$ degrees in diameter.

An episcotister or reticle 14 is interposed between the objective lens 10 and the condensing lens 11 and lies in a plane transverse to the optical axis 12 and at the focal point of the objective lens 10. The purpose of the recticle 14 is to interrupt the radiation impinging upon the detector 13 in order that an alternating signal appears at the output terminals thereof. The reticle 14 is circular in form and is mounted in ballbearings (not shown) disposed around the circumference thereof, its center is on the optical axis 12, and it is rotated by means of a ring gear 15 around the circumference of the reticle 14 which meshes with a pinion gear 16 driven by a motor 17. The motor 17 drives the reticle 14 at a constant speed of 100 revolutions per second. At this speed, the reticle 14 interrupts the radiation at a frequency of 300 to 3800 cycles per second, in a manner which will be made clear hereafter.

To the output terminals of the detector 13 is connected the input circuit of a wideband amplifier 18 which provides preamplification of signals developed by the detector 13. The amplifier 18 has a bandwidth sufficiently wide to pass all interruption frequencies developed by the reticle 14, namely from 300 cycles per second to 3800 cycles per second. To the output terminals of the wideband amplifier 18 is connected one input circuit of a frequency converter or mixer 20. To a second input circuit of the mixer 20 is connected a variable frequency oscillator of the type known as voltage controlled oscillator (VCO) 21 which is tunable from 26.2 to 29.7 kilocycles per second.

The input circuit of a narrowband intermediate frequency amplifier (IF amplifier) 22 is connected to the output circuit of the mixer 20. The IF amplifier 22 is tuned to a frequency of 30 kilocycles per second with a bandwidth of plus or minus 225 cycles per second. The narrow bandwidth may be achieved by high Q tuned circuits, quartz crystals, or mechanical filters, as desired. It is well known that the signal-to-noise ratio of a system is an inverse function of the bandwidth of the system. Therefore, use of the narrowband IF amplifier 22 which passes only a small portion of the spectrum from the mixer 30 will insure a high signal-to-noise ratio. The input circuit of a utilization and control circuit 23 is connected to the output circuit of the IF amplifier 22 and a connection is made from a control output terminal of the utilization and control circuit 23 to a control input terminal of the VCO 21. The utilization and control circuit 23 will be fully described hereafter and the wideband amplifier 18, mixer 20, VCO 21 and IF amplifier 22 are of conventional types.

Figure 2:
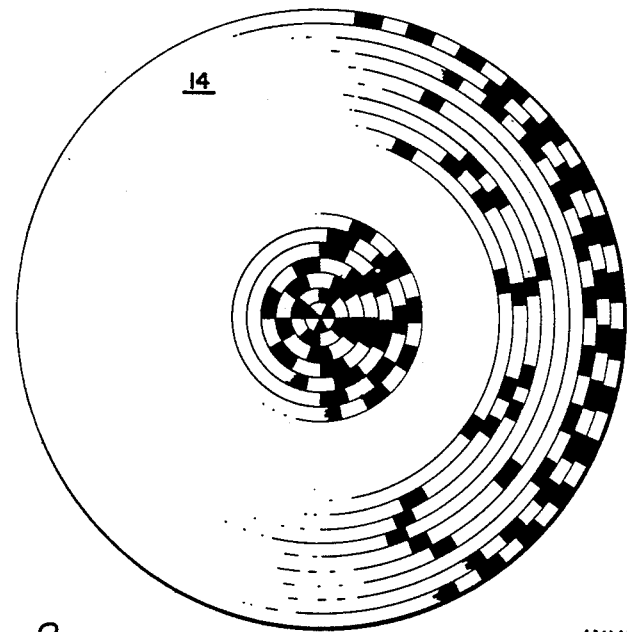
FIG. 2 is a representation of an embodiment of a reticle in accordance with the invention which may be used in the radiation detection system of FIG. 1.

The reticle 14 (illustrated in FIG. 2) is divided into a number of concentric rings which, in the present example, are 35 in number. Each of the rings is approximately one milliradian wide and is divided into alternate transparent and opaque segments. The size of each segment is approximately the size of the smallest circle of resolution of the optical system which, in the present example, is one milliradian. The innermost circle is divided into three opaque and three transparent sections, the next circle into four opaque and four transparent sections and in like manner out to the 35th circle which is divided into 38 opaque and 38 transparent sections. Thus, it will be seen that the opaque and transparent sections are uniform and small in size over the entire surface of reticle 14.

It will be apparent to those skilled in the art that although the reticle 14 intercepts radiation on all of its rings from large background sources such as the sky, when large areas of the reticle 14 are uniformly illuminated, there is a substantially constant number of transparent sections passing radiation to the detector 13. As a result, the output of the detector 13 due to such large sources is substantially free of any interruption signal. As the size of the source decreases, the amplitude of the interruption signal remains relatively small until the image size approaches approximately the size of the transparent and opaque sections of the reticle 14. When this occurs, the radiation is alternately completely blocked or completely transmitted and the interruption signal from the detector 13 is of maximum amplitude. It may thus be seen that the reticle 14 is effective to produce discrimination against background sources producing an image of a size not comparable to the size of the transparent and opaque sections of the reticle 14. This is the well-known discrimination against background sources obtained by virtue of the alternate opaque and transparent sections. The reticle 14 affords discrimination against even relatively small background sources in accordance with these well-known principles by virtue of the uniformly small size of the opaque and transparent sections. Thus, it will be apparent to those skilled in the art that only those sources producing an image whose dimensions are a few milliradians in either direction will produce an interrupted signal of appreciable amplitude at the output of the detector 13. Even further background discrimination is achieved in accordance with the present invention by frequency discrimination as herein described.

An image focused on the central circle is interrupted at a rate of 300 cycles per second inasmuch as the reticle is rotating at 100 revolutions per second, whereas an image falling on the outer ring of the reticle 14 is interrupted at a rate of 3800 cycles per second. Thus, the position of an image on the reticle 14 determines the frequency of the signal developed by the detector 13. An image larger than one milliradian produces a signal having components at more than one interruption frequency.

The frequency of the signal developed by the VCO 21 is heterodyned with the signal developed by the detector 13 to produce an intermediate frequency signal at the output circuit of the mixer 20. When the VCO 21 is tuned to 26.2 kilocycles per second, signals developed by the detector 13 from an image falling on the outer rings of the reticle 14 produce an intermediate frequency signal which is within the passband of the IF amplifier 22. When VCO 21 is tuned to 29.7 kilocycles per second, signals developed by the detector 13 from an image falling on the inner rings of the reticle 14 produce an intermediate frequency which is within the passband of the IF amplifier 22. Inasmuch as the passband of the IF amplifier 22 is 450 cycles wide, signals developed by images falling on any five adjacent rings of the reticle 14 may be passed through the IF amplifier 22 simultaneously. The number of rings "viewed" may be one or more depending upon other system requirements.

It will be apparent that by suitably controlling the frequency of the VCO 21, any selected group of five adjacent frequency components of a signal developed by the detector 13 are passed through the IF amplifier 22 and any other frequency components present in the signal are rejected. In this manner, a particular radiation source or a selected portion of the field of view which is of interest may be placed under surveillance while others are excluded. It will also be apparent that by varying the frequency of the VCO 21, as by sweeping it from one frequency extreme to the other, radiation sources are indicated as pulse output signals whose duration is indicative of the number of different frequency components present. Therefore, a small or point source results in a pulse of short duration while a large background source results in a pulse of large duration.

More precisely, a periodic wave signal appearing at the input of the mixer 20, due to the interruption of radiation producing an image on the reticle 14, is heterodyned with a signal from the VCO 21 to produce an intermediate frequency periodic wave signal at the output of the mixer 20. As the VCO 21 is swept in frequency, the intermediate frequency periodic wave signal appears only momentarily in the passband of the narrowband IF amplifier 22. Thus, the output of the IF amplifier 22 is a short burst or pulse of the periodic wave signal. Accordingly, a small source of radiation producing a small image on only one ring of the reticle 14 and therefore resulting in a signal at a single frequency, produces a short pulse because the intermediate frequency signal is in the passband of the IF amplifier 22 for a short time. On the other hand, a large source of radiation producing a large image focused on several adjacent rings of the reticle 14 results in a signal having several frequency components. This signal, having a larger frequency spectrum, appears in the passband of the IF amplifier 22 for a longer time to produce a longer pulse at the output thereof.

Accordingly, the discrimination against large background radiation sources is excellent because signals resulting from these sources are made to fall outside the passband of the IF amplifier 22. At the same time the signal-to-noise ratio and sensitivity are also excellent because the IF amplifier 22 has a narrow passband. Further, individual portions of the optical field of view may be studied by suitably controlling the frequency of the VCO 21 rather than by mechanical movement of a telescope having a narrow field of view. By choice of a suitable utilization and control circuit 23, any of several types of automatic searching and tracking modes of operation may be accomplished.

Figure 3:
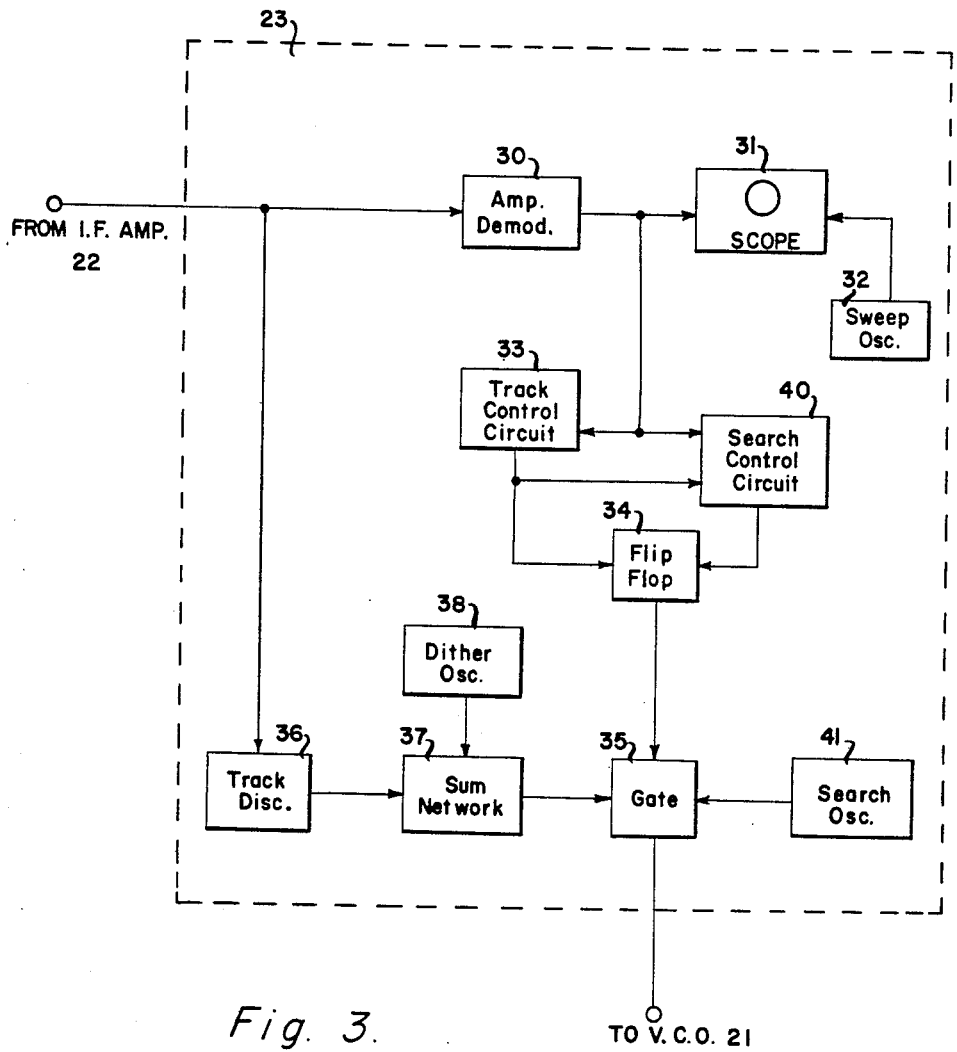
FIG. 3 is a diagram in block form of one type of utilization and control circuit which may be used in the system of FIG. 1.

The utilization and control circuit 23 may be one of several types similar to those used in radar receivers, an exemplary circuit being illustrated in FIG. 3. The output signal from the IF amplifier 22 is applied to an envelope detector or amplitude demodulator 30 which developes direct current (D.C.) pulses. A suitable circuit for the ampliture demodulator 30 is shown on page 554 of Terman's Radio Engineers' Handbook, First Edition, published by the McGraw-Hill Book Co. The D.C. pulses are then applied to a display device such as a cathode ray oscilloscope 31 where they are displayed. The oscilloscope 31 is supplied with a time base or sweep voltage from a sweep oscillator 32. Display devices such as the oscilloscope 31 including the sweep oscillator 32, are well known. For suitable pulse display arrangements, reference is made to the books Times Bases, by O. S. Puckle, published by John Wiley & Sons, Inc., 1951, and Cathode Ray Tube Displays, Volume 22 of the MIT Radiation Laboratory Series, published by the McGraw-Hill Book Co., Inc., 1948. The pulses from the demodulator 30 are also applied to a track control cirrcuit 33 which recognizes pulses of a predetermined duration and develops a recognition pulse at its ouptut circuit in response thereto. The track control circuit 33 may be the pulse recognition device of C. B. Tompkins disclosed in U.S. Patent No. 2,577,827. Recognition pulses from the track control circuit 33 are applied to a bistable multivibrator or flip flop 34 which developes a gate pulse in response thereto, the gate pulse being applied to a gate circuit 35. The gate circuit 35 may comprise a pair of diode "and" gates of the type shown and described in "Digital Computer Components and Circuits" by R. K. Richards, at pp. 37–39.

Output signals from the IF amplifier 22 are also applied to a track discriminator 36 tuned to a center frequency of 30 kilocycles per second which develops an output voltage whose amplitude and polarity is indicative of the frequency of the signal. This tracking voltage is then coupled through a summing network 37 to one of the input terminals of the gate circuit 35 where it may be gated to the VCO 21 to control the frequency thereof. Thus, a target-tracking control loop is formed. A dither oscillator 38 generates a rapidly varying but low amplitude D.C. voltage which is coupled to another input circuit of the summing network 37 where the dither voltage is added to the tracking voltage to cause the VCO 21 to rapidly vary in frequency on either side of its controlled frequency.

A search control circuit 40 has an input circuit connected to the output circuit of the demodulator 30 and has a second input circuit connected to the output circuit of the track control circuit 33. When the pulses are not present at the output circuit of the demodulator 30, the search control circuit 40 develops an output control pulse which triggers the flip flop 34 into its other stable state. The gate pulse thus produced is applied to the gate circuit 35, thereby gating off the track discriminator 36 and the dither oscillator 38 and gating on a search oscillator 41 which may be of the relaxation type. The search control circuit 40 will be more fully described hereafter.

In operation, initially the gate circuit 35 completes the path from the search oscillator 41 to the VCO 21, the track discriminator 36 and dither oscillator 38 being disconnected. The search oscillator 41 applies a sawtooth voltage to the VCO 21 which sweeps in frequency in response thereto. Thus, signals from images focused on successive rings of the reticle 14 are successively passed through the IF amplifier 22 as pulses whose duration is indicative of the size of the image of the radiation source. The pulse signals are demodulated in the amplitude demodulator 30 which develops D.C. pulses in response to applied alternating current pulse signals. The D.C. pulses are applied to the track control circuit 33 which has been preset to recognize pulses of a predetermined duration. Upon recognizing such a pulse, the track control circuit 33 produces a recognition pulse.

The recognition pulse is applied to the flip flop 34 which develops a gate pulse in response thereto which is applied to the gate circuit 35. The gate circuit 35 disconnects the search oscillator 41 from the VCO 21 and completes the path from the track discriminator 36 to the VCO 21. The discriminator 36 develops an output voltage indicative of differences in the frequency of the pulse signal from the center frequency of the IF amplifier 22. The VCO 21 therefore maintains the signal from the selected source or target at a frequency such that it continues to stay within the passband of the IF amplifier 22 even though the target may be moving. The low amplitude sawtooth voltage from the dither oscillator 38 is superimposed on the output voltage from the discriminator to cause the VCO 21 to sweep in frequency to either side of the frequency which maintains the signal in the center of the passband of the IF amplifier 22. This results in a series of pulses appearing at the output circuit of the IF amplifier 22.

If the target should be lost for any reason, the lack of pulses at the output circuit of the demodulator 30 causes the search control circuit 40 to apply a control pulse to the flip flop 34 causing it to change state to develop a gate pulse of opposite polarity. This gate pulse when applied to the gate circuit 35 disconnects the discriminator 36 from the VCO 21 and reconnects the search oscillator 41. If the signal is again recognized by the track control circuit 33, a recognition pulse is produced which again causes the discriminator 36 to be gated on and the search oscillator 41 to be gated off. At the same time, the recognition pulse is also applied to the search control circuit 40 to lock it out until the presence of pulses at the output circuit of the demodulator 30 again prevents the search control circuit 40 from initiating switching to the search mode.

Other utilization and control circuits 23 may be used, for example, range gates, as used in radar receivers, may be used to aid in tracking a desired signal or, alternatively, several range gates may be used to track more than one signal at a time. Furthermore, phase detectors may be used in conjunction with reference signals developed in conjunction with the reticle 14 or the motor 17 to produce error signals indicative of the rectangular coordinates of a target. Alternatively, error signals may be developed by applying a graded film to the back of the reticle 14 to vary the transmissivity across the diameter thereof. If the system of FIG. 1 is in a target-seeking guided missile, the error signals may be used as steering control signals for the missile.

To improve the scanning mode of operation, the bandwidth of the IF amplifier 22 may be narrowed so that frequencies from only two rings of the reticle 14 are passed simultaneously. When a target is recognized, the bandwidth of the IF amplifier 22 may be widened, by utilization of voltage variable capacitors, for example, so that frequencies from four or five rings may be passed to give good discrimination against line sources in the tracking mode.

It will be apparent that a high speed scan of the optical field is possible with this electronic method of scanning. The limitation on the scanning speed is primarily the time constant of the detector 13. The present invention reduces the effect of background noise when the target is on the optical axis 12 by a factor of 140 to one compared to the usual checkerboard type of reticle discussed previously.

When the system of the present invention is used in a missile, the possibility of another target introducing steering components into the missile system is greatly reduced, particularly when the image of the primary target is in the central portion of the reticle 14.

A feature of the system of the present invention is that countermeasures such as a dropped flare may be combatted. Advantage may be taken of the fact that the flare drops away from the target already being tracked. As the flare drops away from the target, the flare signal will be interrupted at successively higher frequencies. The amplitude characteristic of the discriminator 36 may be modified so that the tracking loop gain for the lower frequency signal generated by the target is much greater than the gain for the higher frequency signal due to the flare. The flare energy must now be many times the target energy to cause the tracking system to follow the flare. After the flare has fallen three or four milliradians away from the target, it will be out of the passband of the system and no longer of consequence. In a similar manner, one of two or more targets may be selected. The one producing an image which moves away from the center of the reticle 14 will be lost to the system.

The system of the present invention is well suited for tracking targets having more than one source of radiation such as a plane having several engines. Radiation detection systems having a wide instantaneous field of view cannot track solely one of the engines but rather acts on signals received from all engines simultaneously. The system of the present invention however, is able to lock on to a single one of the engines at greater ranges and is therefore able to track the target more accurately.

FIGS. 4 and 5 illustrate other embodiments of a reticle 14 in accordance with the invention suitable for use in the radiation detection system of FIG. 1. In FIG. 4, the reticle 14a has a spiral configuration rather than a series of concentric rings. In FIG. 5, the reticle 14b is provided with only a narrow segment of alternate opaque and transparent sections. By properly scanning, the complete field may be presented on an oscilloscope or other type of display.

A search control circuit 40 which may be used in the utilization and control circuit 23 is illustrated in FIG. 6. An integrator 50 having a long time constant has its input terminals connected to the output circuit of the amplitude demodulator 30. The output terminals of a blocking oscillator 51 are connected to a gate circuit 52 whose output terminals are connected to the flip flop 34. The gate circuit 52 may be a diode "and" gate of the type shown and described in "Digital Computer Components and Circuits" by R. K. Richards, at pp. 37–39. A monostable one-shot multivibrator 53 has its input terminal connected to the track control circuit 33 and its output terminal connected to the gate circuit 52. When a target is being tracked, the pulses developed at the output of the demodulator 30 are integrated in the integrator 50 to develop a D.C. bias which cuts off the blocking oscillator 51. However, should the target be lost for an extended period of time, the integrator gradually discharges and the blocking oscillator 51 develops an output pulse which is applied through the gate 52 to the flip flop 34 which actuates the gate circuit 35 to connect the search oscillator 31 to the VCO 21. Should contact be re-established with the target, the recognition pulse from the track control circuit 33 is applied to a monostable or one-shot multivibrator 53 which again actuates the gate circuit 52 to prevent pulses from the blocking oscillator 51 being applied to the flip flop 34.

There has been described apparatus for modifying optically received electromagnetic radiation to provide the electronic equivalent of mechanical scanning of an optical field. The system described provides both optimum signal-to-noise ratio and optimum discrimination against large background radiation sources over the entire optical field. In addition, the described apparatus electronically scans at a rapid rate and is relatively simple, inexpensive, and compact.

What is claimed is:

1. Apparatus for responding to radiant energy from a source of a predetermined size comprising: a radiation detector, optical means for focusing radiant energy onto said detector, a rotating reticle interposed between said optical means and said detector and having a plurality of alternately opaque and transparent sections each of a predetermined size for interrupting said radiant energy, said sections being arranged so that the frequency of interruption of said radiant energy is proportional to the radial distance of the path of said radiant energy from the center of said reticle, a frequency converter having a first input circuit coupled to the output terminals of said detector, a voltage-controlled oscillator having its output circuit coupled to a second input circuit of said frequency converter, frequency-selective means having its input circuit coupled to the output circuit of said frequency converter for passing signals having an interruption frequency within a narrow band, means having an output circuit coupled to said oscillator and an input circuit coupled to the output circuit of said frequency-selective means for sweeping the frequency of said oscillator until the occurrence of a signal at the output circuit of said frequency-selective means having a predetermined time duration and thereafter controlling the frequency of said oscillator to maintain the signal at the output circuit of said frequency-selective means within said narrow frequency band, and utilization apparatus coupled to the output circuit of said frequency-selective means.

2. Apparatus for effectively scanning an optically focused field by electronic means to recognize radiant energy from a source of a predetermined size comprising: a rotatably mounted reticle, a radiation detector disposed on one side of said reticle, optical means disposed on the other side of said reticle for focusing radiant energy from a source through said reticle and onto said detector, said reticle having a plurality of alternately opaque and transparent sections for interrupting said radiation, the size of each of said sections being substantially the same as the size of an image of a source to be recognized, the frequency of interruption of said radiant energy being a function of the radial distance of the image of said source from the center of said reticle, means for rotating said reticle about its center at a uniform speed, a frequency converter having a first input circuit coupled to the output terminals of said detector, a variable frequency oscillator having its output circuit coupled to a second input circuit of said frequency converter, frequency-selective means having its input circuit coupled to the output circuit of said frequency converter for passing signals having an interruption frequency within a narrow band, a pulse recognizer having its input circuit coupled to the output circuit of said frequency-selective means for developing a recognition signal in response to a pulse having a predetermined time duration, means having an output circuit coupled to said oscillator and a first input circuit coupled to the output circuit of said pulse recognizer and a second input circuit coupled to the output circuit of said frequency-selective means for sweeping the frequency of said oscillator until the occurrence of a recognition signal and thereafter controlling the frequency of said oscillator to maintain the frequency of the output signal of said frequency-selective means within said narrow frequency band, and utilization apparatus coupled to the output circuit of said frequency-selective means.

3. Apparatus for changing optically received radiant energy into a form suitable for utilization in electronic circuits comprising: a reticle, a radiation detector disposed on one side of said reticle, optical means disposed on the other side of said reticle for focusing an image of a source of radiant energy through said reticle and onto said detector, said reticle having a plurality of concentric circular rows of alternately opaque and transparent sections, the size of each of said sections being substantially the same as the size of an image of said source, the number of said sections in each of said rows being a function of the radial distance of each of said rows from the center of said reticle, means for rotating said reticle about its center at a uniform speed for interrupting radiant energy passing therethrough, a frequency converter having a first input circuit coupled to the output terminals of said detector, a variable frequency oscillator having an output circuit coupled to a second input circuit of said frequency converter, frequency selective means having an input circuit coupled to the output circuit of said frequency converter for passing signals having an interruption frequency within a narrow frequency band, means coupled to said variable frequency oscillator for controlling the frequency thereof, and a utilization device coupled to the output circuit of said frequency selective means.

4. Apparatus for modifying optically received radiant energy comprising: a reticle, a radiation detector disposed on one side of said reticle, optical means disposed on the other side of said reticle for focusing an image of a source of radiant energy through said reticle and onto said detector, said reticle having a plurality of concentric circular rows of alternately opaque and transparent sections, the size of each of said sections being substantially the same as the size of the smallest image of a source to be resolved, the number of said sections in each of said rows being a function of the radial distance of each of said rows from the center of said reticle, means for rotating said reticle about its center at a uniform speed for interruption of radiant energy passing therethrough, a wideband preamplifier having its input circuit coupled to the output terminals of said detector, a frequency converter having a first input circuit coupled to the output circuit of said preamplifier, a variable frequency oscillator having its output circuit coupled to a second input circuit of said frequency converter, a narrowband amplifier having its input circuit coupled to the output circuit of said frequency converter, and a utilization and control circuit coupled to the output circuit of said narrowband amplifier and to the control input circuit of said variable frequency oscillator.

5. Apparatus for receiving radiant energy comprising:
(a) a radiation detector disposed along an axis for developing electrical signals in response to intercepted radiant energy;
(b) means interposed between a source of said radiant energy and said detector for periodically interrupting said radiant energy, said interrupting means providing a substantially constant frequency of interruption for any fixed amount of angular deviation of the direction of said source with respect to said axis, said interrupting means providing a frequency of interruption that is a function of the amount of angular deviation of the direction of said source with respect to said axis;
(c) frequency-selective means for passing solely signals having a frequency within a predetermined frequency band and rejecting signals of other frequencies, said frequency-selective means being coupled to said radiation detector and responsive to signals developed thereby;
(d) and utilization means coupled to said frequency-selective means and responsive to signals having a frequency within said predetermined frequency band passed thereby.

6. Apparatus for receiving radiant energy comprising:
(a) a radiation detector disposed along an axis for developing electrical signals in response to intercepted radiant energy;
(b) means interposed between a source of said radiation and said detector for periodically interrupting said radiant energy, said interrupting means providing a substantially constant frequency of interruption for any fixed amount of angular deviation of the direction of said source with respect to said axis, said interrupting means providing a frequency of interruption that is a function of the amount of angular deviation of the direction of said source with respect to said axis;
(c) frequency-selective means for passing solely signals having a frequency within a predetermined frequency band and rejecting signals of other frequencies;
(d) frequency changing means coupling said detector to said frequency-selective means for changing the frequency of signals from said detector having a preselected frequency and applying them to said frequency-selective means as signals within said predetermined frequency band;
(e) and utilization means coupled to said frequency-selective means and responsive to signals having a frequency within said predetermined frequency band passed thereby.

7. Apparatus for receiving radiant energy comprising:
(a) a radiation detector disposed on an optical axis;
(b) optical means disposed on said axis for focusing radiant energy onto said detector;
(c) means interposed between said optical means and said detector for periodically interrupting focused radiant energy, said interrupting means providing a substantially constant frequency of interruption for any fixed amount of angular deviation of the direction of a source of said radiation with respect to said axis, said interrupting means providing a frequency of interruption that is a function of the amount of angular deviation of the direction of said source with respect to said axis;
(d) a frequency converter coupled to said detector for changing the frequency of signals from said detector in accordance with an applied local oscillator signal;
(e) a variable frequency oscillator coupled to said frequency converter for applying said local oscillator signal thereto;
(f) frequency-selective means coupled to said frequency converter for passing solely signals having a frequency within a predetermined frequency band and rejecting signals of other frequencies;

(g) and utilization means coupled to said frequency-selective means and responsive to signals having a frequency within said predetermined frequency band passed thereby.

8. A device for periodically interrupting radiant energy focused to form an image on the device with relative motion between the image and the device comprising: a reticle having a plurality of contiguous concentric circular rows of alternately opaque and transparent sections of substantially equal size, the size of said sections being substantially the same as the size of the smallest image focused on said reticle, there being a different number of said sections in each of said rows, the number of said sections in said rows being a function of the radial distance of each of said rows from the center of said reticle.

9. A device for periodically interrupting radiant energy focused to form an image on the device with relative motion between the image and the device comprising: a reticle having a contiguous spiral path uniformly divided into alternately opaque and transparent sections of substantially equal size, the size of said sections being substantially the same as the size of the smallest image focused on said reticle.

10. A device for periodically interrupting radiant energy focused to form an image on the device with relative motion between the image and the device comprising: a reticle having a radial segment divided into contiguous arced rows of alternately opaque and transparent sections of substantially equal size, the size of said sections being substantially the same as the size of the smallest image focused on said reticle, the number of said sections in each of said rows being different, the number of said sections in said rows being a function of the radial distance of each of said rows from the center of said reticle.

References Cited in the file of this patent

UNITED STATES PATENTS

| | | |
|---|---|---|
| 2,403,983 | Koenig | July 16, 1946 |
| 2,819,409 | Williams | Jan. 7, 1958 |
| 2,892,124 | Rabinow | June 23, 1959 |
| 2,967,247 | Turck | Jan. 3, 1961 |
| 3,000,255 | Iddings | Sept. 19, 1961 |

FOREIGN PATENTS

| | | |
|---|---|---|
| 268,899 | Switzerland | June 15, 1950 |
| 1,193,601 | France | May 4, 1959 |